J. E. MORGAN.
Bee-Hive.
No. 204,678. Patented June 11, 1878.
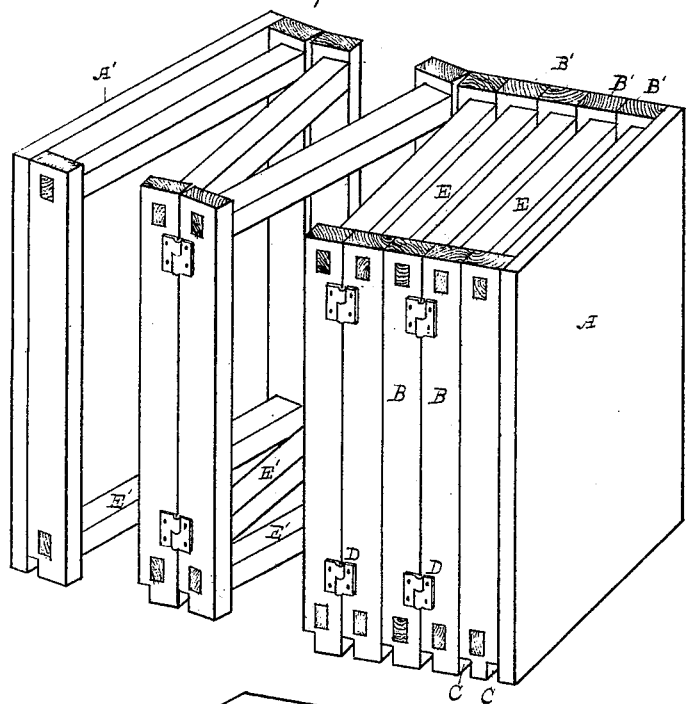
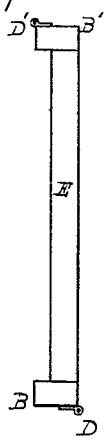
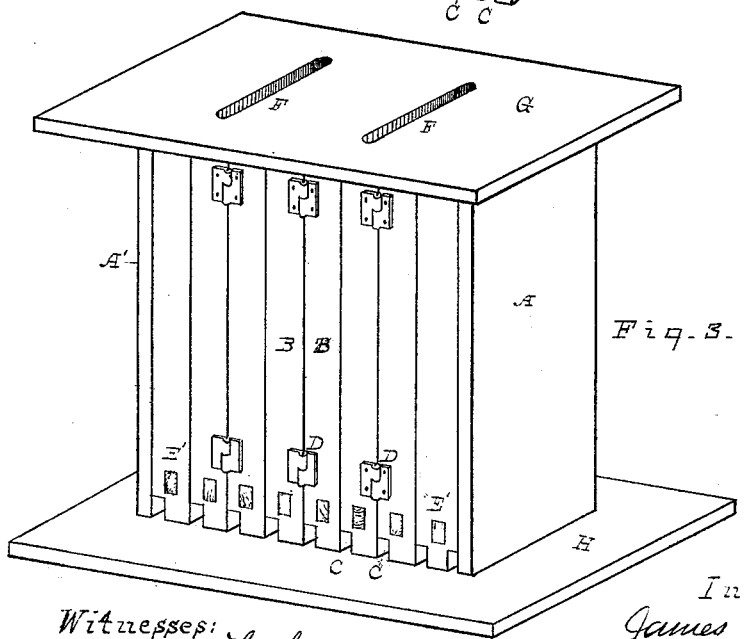
Witnesses:
John A. Hughes
O. J. Bailey
Inventor:
James E. Morgan
By J. S. Berk
Atty

UNITED STATES PATENT OFFICE.

JAMES E. MORGAN, OF PADUCAH, KENTUCKY.

IMPROVEMENT IN BEE-HIVES.

Specification forming part of Letters Patent No. 204,678, dated June 11, 1878; application filed May 6, 1878.

*To all whom it may concern:*

Be it known that I, JAMES E. MORGAN, of Paducah, in the county of McCracken and State of Kentucky, have invented a new and useful Improvement in Bee-Hives, which improvement is fully set forth in the following specification and accompanying drawings, in which—

Figure 1 is a perspective view of my hive. Fig. 2 is a top view of one of the frames, and Fig. 3 is a perspective elevation of the hive complete.

The object of my invention is to provide a cheap, simple, and substantial bee-hive, so constructed that the frames for the comb can be easily removed or replaced, and whereby the said frames themselves form the body of the hive, and are so connected with each other that they are self-supporting. It is composed of a series of frames, hinged together alternately, and inclosed at the two open ends with a suitable case, and provided with a bottom, on which the frames rest, and a top, as in ordinary hives, the frames operating as will hereinafter be more fully described.

In the drawings, A A' represent the casing; G, the top, provided with slots F; and H, the bottom of the hive. B shows the upright of the frame, being connected with a like upright on the opposite side of the hive by cross-piece E at the top and E' at the bottom of said upright. These uprights have gains C cut out of one side of their lower end to provide an entrance for the bees. The cross-pieces E E' are made one-third smaller than the uprights B B', as shown more clearly in Fig. 2.

Having thus constructed the frames, which are duplicates of each other, I connect each alternate upright B with hinges D, and on the opposite side of the hive the alternate uprights B' by hinges D'. Any form of hinge, or simply eyelets, can be used; but I prefer common hinges fastened with screws.

It will be seen that a hive thus connected will be compact, and have sufficient room between the cross-pieces E for the movement of bees, and also provides the most suitable means for the entrance and exit of bees while at work.

I lay no claim to the construction of the frames; but

What I do claim as new, and desire to secure by Letters Patent, is—

The combination of frames B B', hinged alternately, as shown, having gains C and cross-pieces E E', substantially as herein described and set forth.

In testimony that I claim the foregoing I have hereunto set my hand this 25th day of March, A. D. 1878, in the presence of witnesses.

JAMES E. MORGAN.

Witnesses:
W. H. HARRIS.
L. R. STONE.